Sept. 16, 1969  R. P. WILSON  3,466,771
EARTH MOVER VEHICLE SEPARABLE INTO PLURAL UNITS
Filed Sept. 20, 1966  5 Sheets-Sheet 1
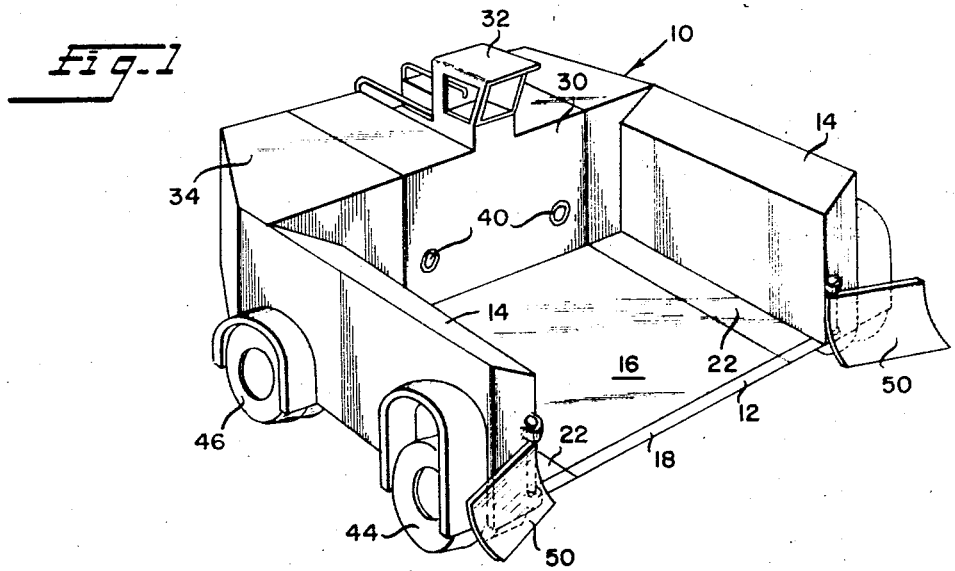
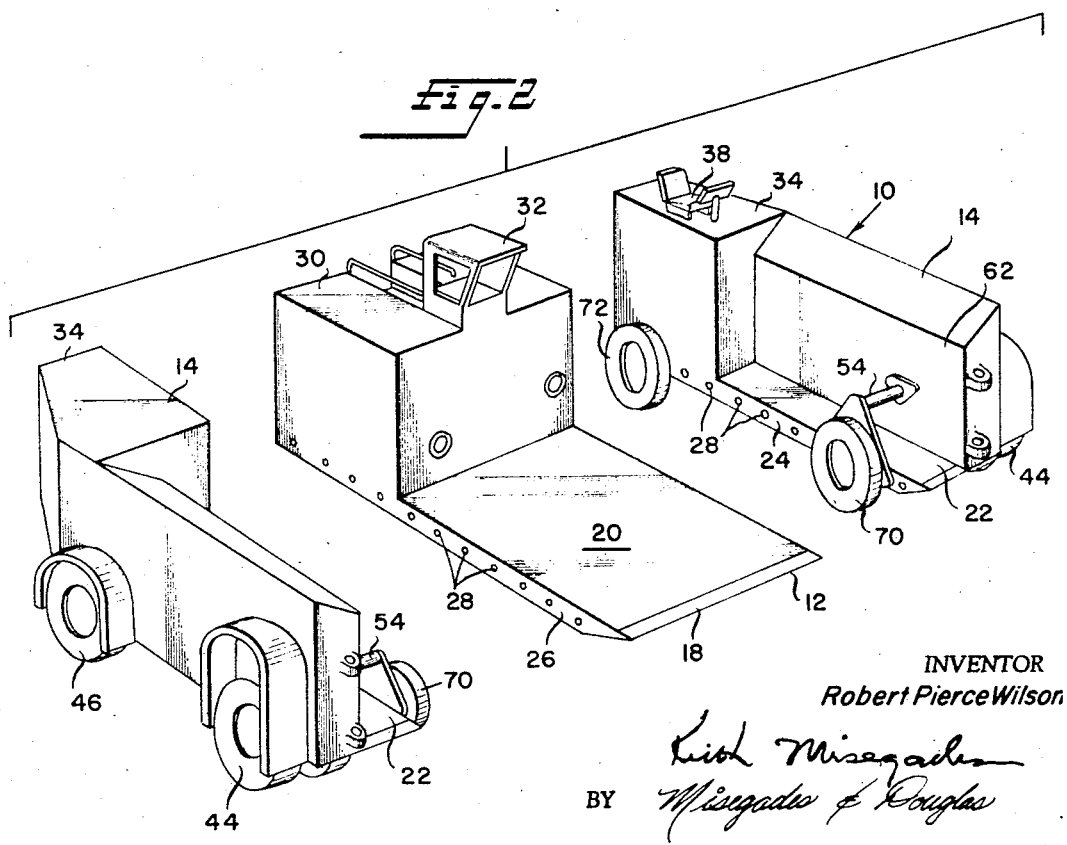
INVENTOR
Robert Pierce Wilson
BY
ATTORNEYS

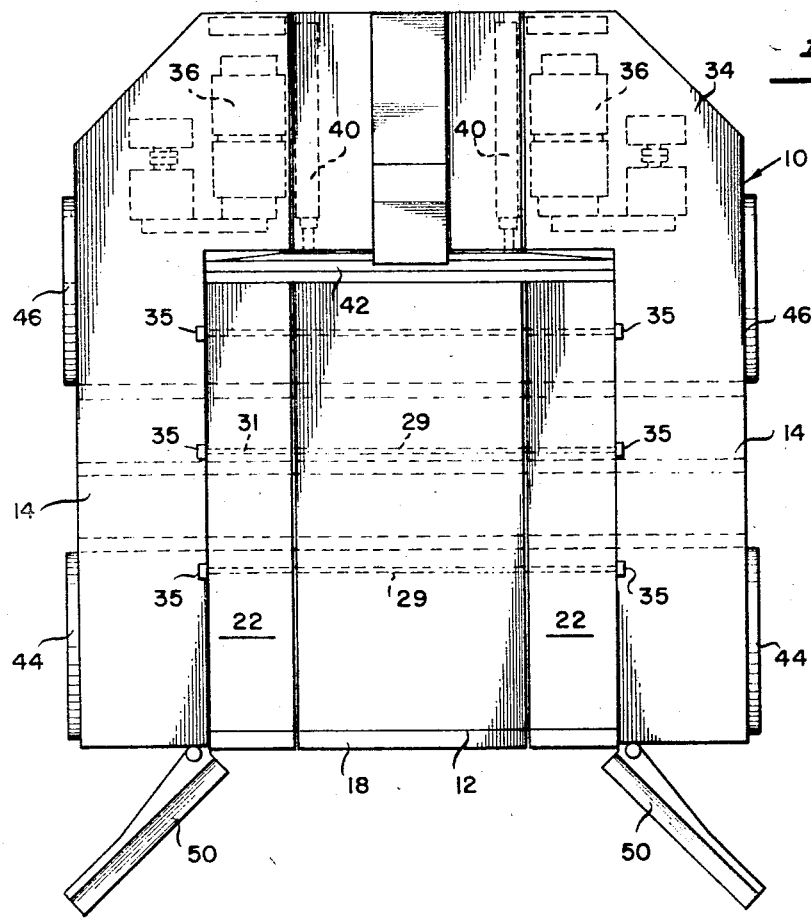
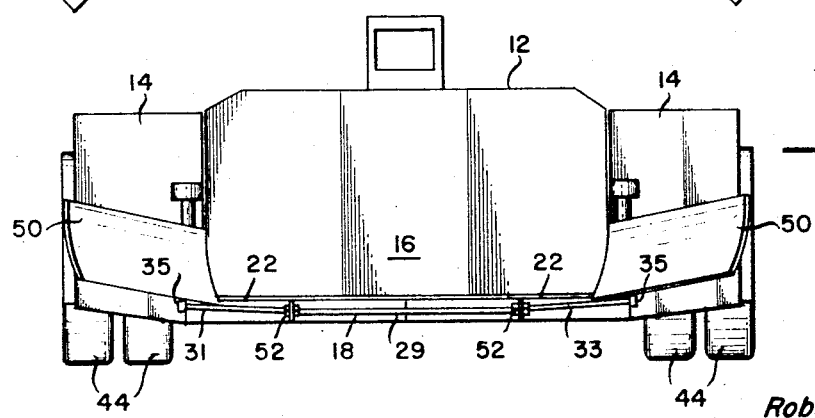

Sept. 16, 1969        R. P. WILSON        3,466,771
EARTH MOVER VEHICLE SEPARABLE INTO PLURAL UNITS
Filed Sept. 20, 1966        5 Sheets-Sheet 3
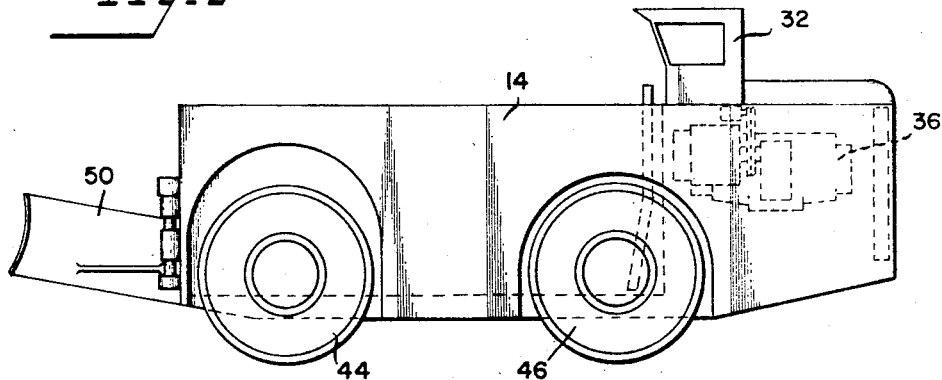
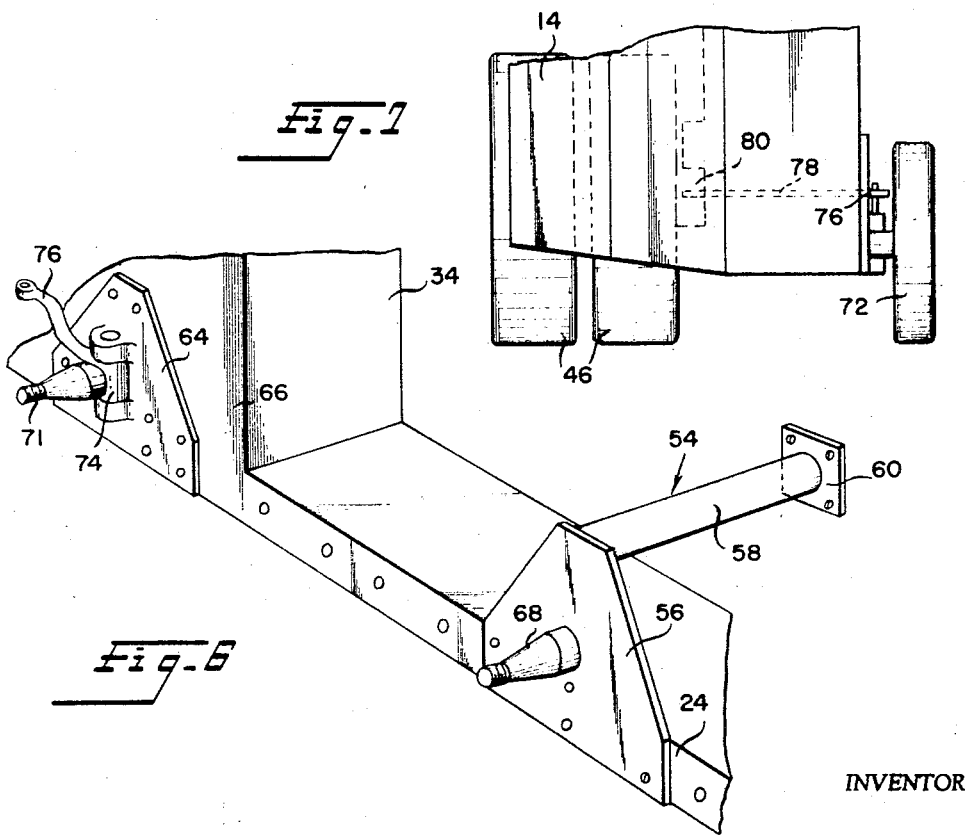
INVENTOR
Robert Pierce Wilson
BY
ATTORNEYS

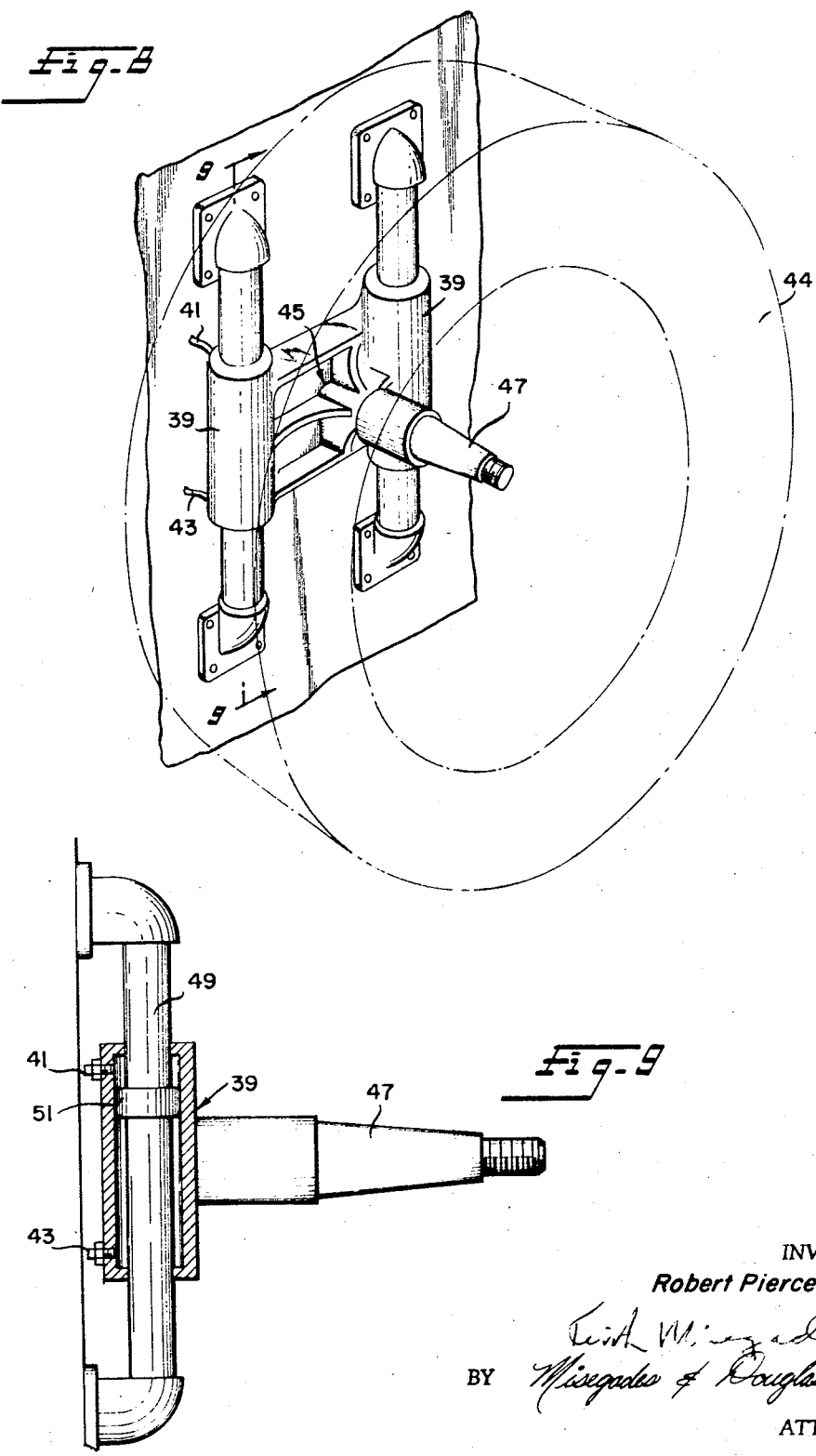

Sept. 16, 1969          R. P. WILSON          3,466,771

EARTH MOVER VEHICLE SEPARABLE INTO PLURAL UNITS

Filed Sept. 20, 1966          5 Sheets-Sheet 5

INVENTOR
Robert Pierce Wilson

BY *Misspaides & Douglas*

ATTORNEYS

United States Patent Office 3,466,771
Patented Sept. 16, 1969

3,466,771
EARTH MOVER VEHICLE SEPARABLE
INTO PLURAL UNITS
Robert P. Wilson, Taylorsville, Calif.
(P.O. Box 590, Cushing, Okla. 74023)
Filed Sept. 20, 1966, Ser. No. 580,644
Int. Cl. E02f 3/76, 3/96
U.S. Cl. 37—126                    12 Claims

ABSTRACT OF THE DISCLOSURE

A load carrying earth moving vehicle for off-the-road operations divisible lengthwise into seperate units for transport between work locations with power means for driving the vehicle as a whole or for independently propelling its wheel carrying side units. The assembled vehicle provides a dirt box of large capacity, means for mounting earth working implements at the front end of the box, and means for raising and lowering the front end of the box to position the implements at earth working elevations to load the box.

The present invention has for its principal object the provision of a load carrying earth mover for off-the-road operations in which complementary side units or parts, each supported on wheels and individually powered, are spaced apart parallel to each other and detachably connected on opposite sides of a central part or unit which provides a load carrying platform, the side units and the platform together forming a dirt box of large capacity. When disconnected from each other for transport between work locations, the individually powered side units are adapted, by the addition of auxiliary wheels, to be driven over the public roads or highways. A feature of the invention resides in means for mounting earth working implements on the front end of the vehicle for loading the box, and means for supposting its front end on jacks to permit the box to be tilted and the implements to be raised or lowered into and out of their earth working positions. Other features and objects will appear from the following specification.

FIGURE 1 is a perspective view of the earth moving vehicle embodying the present invention;

FIGURE 2 is an exploded view of the earth moving vehicle of the present invention, illustrating it separated into three independent units with auxiliary wheel means connected thereto;

FIGURE 3 is a top plan view of the vehicle of the present invention shown in its assembled operative position;

FIGURE 4 is a front view of the vehicle;

FIGURE 5 is a side elevational view of the earth moving vehicle embodied in the present invention;

FIGURE 6 is an enlarged detail view of the means for attaching the auxiliary wheels to the side sections of the vehicle;

FIGURE 7 is a detail view of the means of attaching the auxiliary wheels to the steering mechanism of the vehicle;

FIGURE 8 is a perspective view illustrating the means for raising and lowering the front end of the vehicle;

FIGURE 9 is an elevational view of the raising means shown in FIGURE 8, partly in section.

Figure 10:
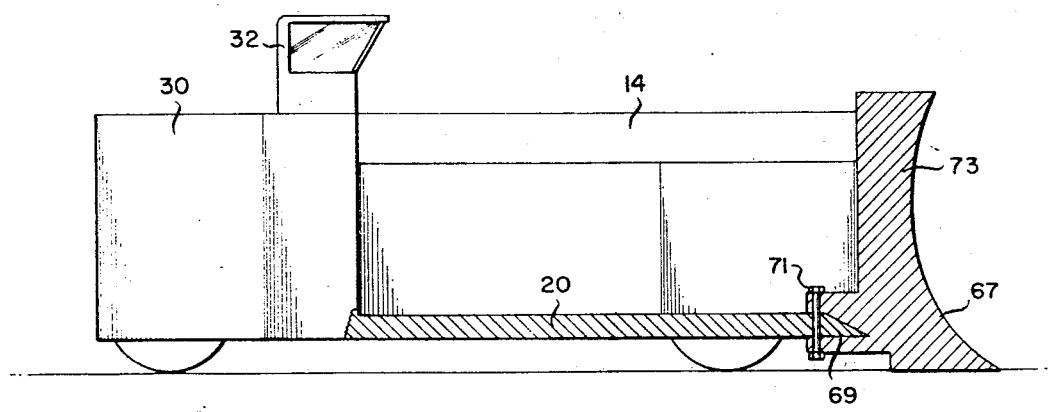
Figure 11:
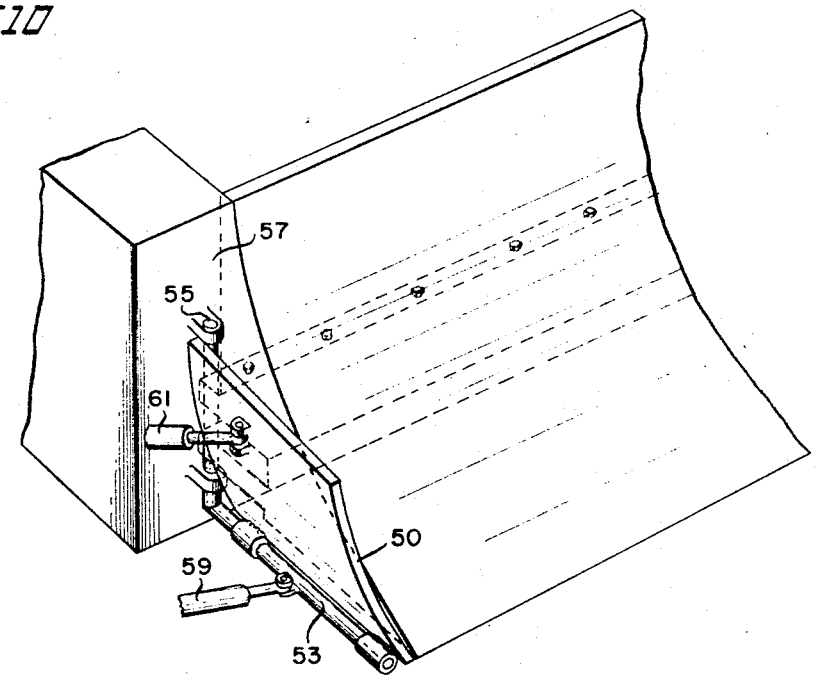

Referring to the drawings the reference numeral 10 generally designates the earth moving vehicle of the present invention which is provided with a central or middle section or unit 12 and opposite side sections or unts 14.

The vehicle is provided with a front loading box 16 for receiving dirt and earth therein that is scraped from the ground by the scraper blade 18. The earth receiving box 16 is formed by a central longitudinally extending platform 20 and two longitudinally extending side platforms or frames 22 on the side sections 14. The side frames 22 extend inwardly from the side units 14 and have side edges 24 that mate with the side edges 26 of the central member or platform 20.

Referring to FIGURE 2 it will be noted that the side edges 24 and 26 are provided with aligned openings or holes 28 therein for receiving bolt members of conventional construction so as to secure in a rigid fashion the central unit 12 to each of the side units 14 as best seen in FIGURE 1.

The understructure of the central section and the side sections are provided with pipes 29, 31, and 33 secured thereto by welding and the like so as to provide openings through which cables extend. The central pipes 29 are substantially horizontally extending while the outer side pipes 31 and 33 are inclined at an angle, as best seen in FIGURE 4. The pipes extend transversely of the earth mover vehicle and are disposed in a spaced relationship longitudinally of the vehicle, as best seen in FIGURE 3. The pipes are in alignment with one another so that the steel cable may be easily threaded therethrough and so that nuts 35 may be properly secured to the opposite ends of the cable by any well known means so that the cable is prestressed in order to support the earth holding platform of the vehicle. The particular length of the pipes may be varied as desired, and the number of pipes and prestressed cables and the size of the pipes and prestressed cables may be of any desired size.

The central unit 12 is provided with an upstanding box section 20 having a cab 32 therein adjacent the rear end of the horizontal platform 20 for operating the vehicle by the driver.

The side units 14 are provided with back housings or engine compartments 34 in which are disposed the drive means 36 for propelling the vehicle. The drive means may be of any conventional type such as an internal combustion engine or a motor and generator unit. It will also be noted that a driver control 38 position may be provided atop the engine compartment 34 so as to propel the side units when they are separated from the middle or central unit shown in FIGURE 2.

Referring to FIGURE 3 it will be noted that the central unit 12 is provided with two longitudinally extending hydraulic ram means 40 operatively connected to a pusher member 42 for pushing earth from the box 16 when desired.

The vehicle is provided with double front wheels 44 secured by conventional means to the front outside portion of the side units 14. Double rear driven wheels 46 operatively connected to the engine 36 for driving thereby by any well known means are provided adjacent the rear outside portion of the side sections 14.

Hydraulic means are provided for raising and lowering the front ends of the sections 14 so as to tilt the front loading box upwardly and downwardly with respect to the wheels 44 in order to dig into the earth. Referring to FIGURE 8 and FIGURE 9 it will be seen that the hydraulic lifting and lowering means comprises twin vertical spaced cylinders 39 having oil inlet and discharge means 41 and 43. The spaced cylinders 39 are rigid and are secured to one another through a spider connection 45. The spider connection is provided with a stub axle 47 upon which is disposed the wheel 44 by any well known means. Piston rods 49 secured at their opposite ends by bolt means to the side of the vehicle are provided with pistons 51 disposed within the hydraulic cylinders 39. When hydraulic fluid is supplied through the inlet line 41 to the top of the piston 51 it will force the rod 49 downward and lower the front end of the vehicle with respect to the wheel 44. When it is desired to raise the front end of the vehicle the oil or hydraulic fluid enters the inlet line 43 and the fluid on top of the piston 51 is discharged through the line 41. Thus the vehicle front end may be raised or lowered as desired. Each wheel of the vehicle, if desired, may be provided with an individual raising and lowering hydraulic means.

The front end of the vehicle is provided with a horizontal blade scraper 18 extending along the lower front edge of the earth box 16 for scraping dirt from the ground surface and directing it into the box 16 by forward movement of the vehicle when its front end is lowered as above described. Other implements, such as the blades 50, may be mounted on the side units 14 to assist in performing these and other earth working operations.

The earth moving vehicle is shown in its assembled operative position in FIGURE 1. When it is desired to separate the vehicle into its separate component parts or units the bolts 52, shown in FIGURE 4, rigidly securing the central unit to the side units are removed, the nuts 35 are released, the cables in pipes 39, 31 and 33 are disconnected and the vehicle is then otherwise disassembled into the three separate longitudinally extending units shown in FIGURE 2. The central unit 12 may be disposed on jacks and the side units 14 may also be disposed on jacks before the bolts are removed from the aligned holes or openings. Any suitable method of supporting the units when it is desired to separate them into the three separate units shown in FIGURE 2 may be used, as this does not form the invention. After the units have been detached from each other they are then separated a sufficient distance or spaced apart so that auxiliary wheels may be connected to the side units 14. It might be added at this time that the vehicle is also provided with any well known and suitable means for detaching the drive means 36 from their conventional controls disposed in the central box structure 30, and with suitable means to operate the side units from the driver control 38 disposed on each side unit 14.

After the units have been separated from each other, a wheel assembly member 54 as seen in FIGURE 6 is connected to each front end of the side units 14. The wheel assembly member 54 is provided with a vertical plate 56 that is bolted to the side edge 24 and a tubular member 58 which extends across the side section platform 22 and has a square vertical plate 60 secured thereto which plate is bolted to the inner vertical wall 62 of the side units 14.

Each side unit 14 is provided with a rear auxiliary wheel by securing the wheel bracket plate 64 to the vertical side wall 66 of the engine compartment housing 34 as best seen in FIGURE 6. The bracket plate 56 is provided with a suitable well known wheel axle 68 to which the front auxiliary wheel 70 is connected by well known means while the rear wheel bracket plate 64 is also provided with a well known axle 71 for suitably connecting the auxiliary rear wheel 72 thereto.

The plate 64 is provided with a king pin 74 with an arm 76, as best seen in FIGURE 6, for connecting it by a tie rod 78 to the main drive steering mechanism 80 of the rear wheels 46.

Thus when it is desired to dismantle the wide front end loading earth moving vehicle of the present invention it is only necessary to attach the auxiliary wheels 70 and 72 to each separated side unit 14 and the side units 14 may then be self-propelled over a narrow highway or a rail to a new point of use.

The central unit or section 12 may be transported by a trailer truck or rail to a new point of use. After the separate parts arrive at the new site, it is only necessary to place them on jacks or other conventional means and remove the auxiliary wheels from the side units, and again bolt the three parts together so as to form the large capacity wide earth moving vehicle which is again ready for operation.

From the foregoing description it is apparent that the present invention provides a novel front end loading earth moving device that consists of three detachable units which can be readily assembled and split longitudinally into three narrow units so as to facilitate movement of the vehicle in a dismantled condition from one place to another, after which the lighter weighing separate narrow units may again be rigidly secured to each other so as to form and provide a very large capacity earth moving scraper vehicle.

The present invention further provides a front end loading earth moving device that consists of detachable units which can be readily strengthened by utilizing pipe or channel members disposed in alignment with one another under the central section with cable threaded therethrough and tightened so as to maintain the cable in a prestressed condition in order to lend rigidity to the vehicle.

Inasmuch as various changes may be made in the relative arrangement and location of the various parts of the invention without departing from the spirit and scope of the invention, it is not meant to limit the invention except by the scope of the appended claims.

What is claimed is:

1. A load carrying earth moving vehicle comprising side units spaced apart and extending parallel to each other from front to back of the vehicle, supporting wheels adjacent opposite ends of each unit, each of said units having individual power means operative to drive one of its supporting wheels, a central unit detachably and rigidly connecting the spaced side units and including a substantially horizontal load carrying platform, the side units and said platform together forming the side walls and floor of a dirt box, said units being capable of disassembly from each other and reassembly to each other for transport between work locations.

2. The vehicle defined in claim 1 in which the side units are supported near their forward ends by jacks operative to raise and lower the front end of the vehicle with respect to its front wheels, and an earth moving implement is provided on the front end of the vehicle for engaging and lifting earth onto said platform by forward movement of the vehicle when its front end is lowered into earth working position.

3. The earth moving vehicle of claim 2 wherein said earth moving platform has a front edge and a main scraper blade is detachably connected thereto.

4. The vehicle of claim 3 wherein additional earth working blades are attached to said vehicle at opposite ends of said main scraper blade.

5. The vehicle of claim 1 wherein said vehicle is provided with a central longitudinally extending part having a horizontal earth holding platform in the front and an upstanding housing rearwardly thereof, and said platform is disposed in abutting relationship with the inner sides of said separable parts earth holding portions to form a front end loading box.

6. An earth moving vehicle having at least two separable parts, wheels disposed on opposite sides of said vehicle adjacent the front and rear ends thereof, at least two power drive units with one power unit disposed in each of said two separable parts for driving the vehicle rear wheels, means detachably connecting said parts together along the longitudinal axis thereof, and auxiliary wheels for attachment to said two separable parts and means for attaching said auxiliary wheels to said two separable parts adjacent the front and rear ends thereof, said at least two vehicle separable parts each having a rear engine compartment and a longitudinally extending vertical portion with an earth holding horizontal portion on one side of said vertical portion, the earth handling portion of one of said separable parts being on the right side, and the earth handling portion of the other of said separable parts being on the left side so that said earth handling portions face each other when said separable parts are joined to form an earth handling vehicle.

7. The vehicle of claim 6 wherein a central part is provided between said separable parts, and said separable parts and central part each having side edges, and said detachable connecting means comprise bolt means connecting opposite side edges of said central part to complementary side edges of said separable parts.

8. The vehicle of claim 7 wherein said side edges have aligned hole means therein for receiving said bo't means.

9. The vehicle of claim 6 wherein said attaching means for attaching the auxiliary wheels to the front end of said vehicle includes an axle and plate with a tube member extending across the earth holding horizontal portion of said separable part.

10. The vehicle of claim 6 wherein the attaching means for attaching the auxiliary wheels to the rear end of said separable parts comprises an axle and plate member, and king pin and arm attachable to the vertical portion of said separable parts.

11. The vehicle of claim 10 having a steering mechanism for said rear wheels and a tie rod connecting said arm to the steering mechanism.

12. The vehicle of claim 6 wherein the front end of said separable parts earth holding portion and is provided with a scraper blade.

References Cited

UNITED STATES PATENTS

| | | | |
|---|---|---|---|
| 2,418,813 | 4/1947 | Anderson | 37—126 |
| 2,513,700 | 7/1950 | Wood | 37—124 |
| 2,551,231 | 5/1951 | Anderson | 180—6.48 |
| 2,678,105 | 5/1954 | Peterson | 180—6.48 |
| 2,795,872 | 6/1957 | Wardle | 37—126 |
| 2,955,845 | 10/1960 | Carroll et al. | 180—6.48 |
| 2,990,026 | 6/1961 | Albee | 180—14 XR |
| 3,038,265 | 6/1962 | Hunger et al. | 37—124 XR |
| 3,060,601 | 10/1962 | Reynolds | 37—126 |
| 3,063,173 | 11/1962 | Wardle | 37—126 |
| 3,089,261 | 5/1963 | Flath | 37—118 |
| 3,101,150 | 8/1963 | Janson et al. | 180—89 XR |
| 3,181,256 | 5/1965 | Discenza | 37—117.5 |
| 3,235,985 | 2/1966 | Lauster | 37—126 |
| 3,280,931 | 10/1966 | Cahill et al. | 180—23 |
| 3,334,702 | 8/1967 | Granryd | 180—51 |

EDGAR S. BURR, Primary Examiner

U.S. Cl. X.R.

180—14; 280—29